United States Patent [19]
Gehatia et al.

[11] 3,766,786
[45] Oct. 23, 1973

[54] MAGNETIC FLOAT PYCNOMETER

[75] Inventors: Matatiahu Gehatia; Karl G. Leinberger; Donald R. Wiff, all of Dayton, Ohio

[73] Assignee: The United States of America as represented by the Secretary of the Air Force, Washington, D.C.

[22] Filed: Dec. 2, 1971

[21] Appl. No.: 204,243

[52] U.S. Cl. .............................................. 73/453
[51] Int. Cl. .............................................. G01n 9/18
[58] Field of Search ................ 73/453, 32, 194 EM, 73/405

[56] References Cited
UNITED STATES PATENTS

| | | | |
|---|---|---|---|
| 2,635,461 | 4/1953 | Groth et al. | 73/434 |
| 2,981,111 | 4/1961 | McIlwraith et al. | 73/453 |
| 3,388,585 | 6/1968 | Hargens | 73/32 |
| 3,503,267 | 3/1970 | Kamekichishiba et al. | 73/32 X |

OTHER PUBLICATIONS

MacInnes et al., Review of Scientific Instruments, Vol. 22, No. 8, Magnetic Float Method for Determining Densities, 8/51, pg. 642-646.

Beams et al., Review of Scientific Instruments, Vol. 33, No. 7, Magnetic Suspension Balance Method for Densities, 6/62, pg. 750-753.

*Primary Examiner*—Richard C. Queisser
*Assistant Examiner*—Stephen A. Kreitman
*Attorney*—Harry A. Herbert, Jr.

[57] ABSTRACT

A magnetic float pycnometer system for precise measurements of liquid densities is disclosed. A float having a permanent magnet, enclosed in a closed couette, centered horizontally by the repelling action of three external magnets, is positioned vertically with respect to a light beam by the resultant forces of buoyancy acting in an upward direction, gravity acting downward, and the downward acting magnetic force resulting from the interaction of the magnetic field from the magnet in the float and the magnetic field created by a current in an external solenoid. Vertical stability is achieved by operating the float magnet at or near the point of inflection of the magnetic field of the solenoid where a decreasing force with decreasing displacement of the float from the solenoid exists. The magnitude of the current in the solenoid to position the float is a relative measure of the density of the fluid in the couette.

1 Claim, 7 Drawing Figures

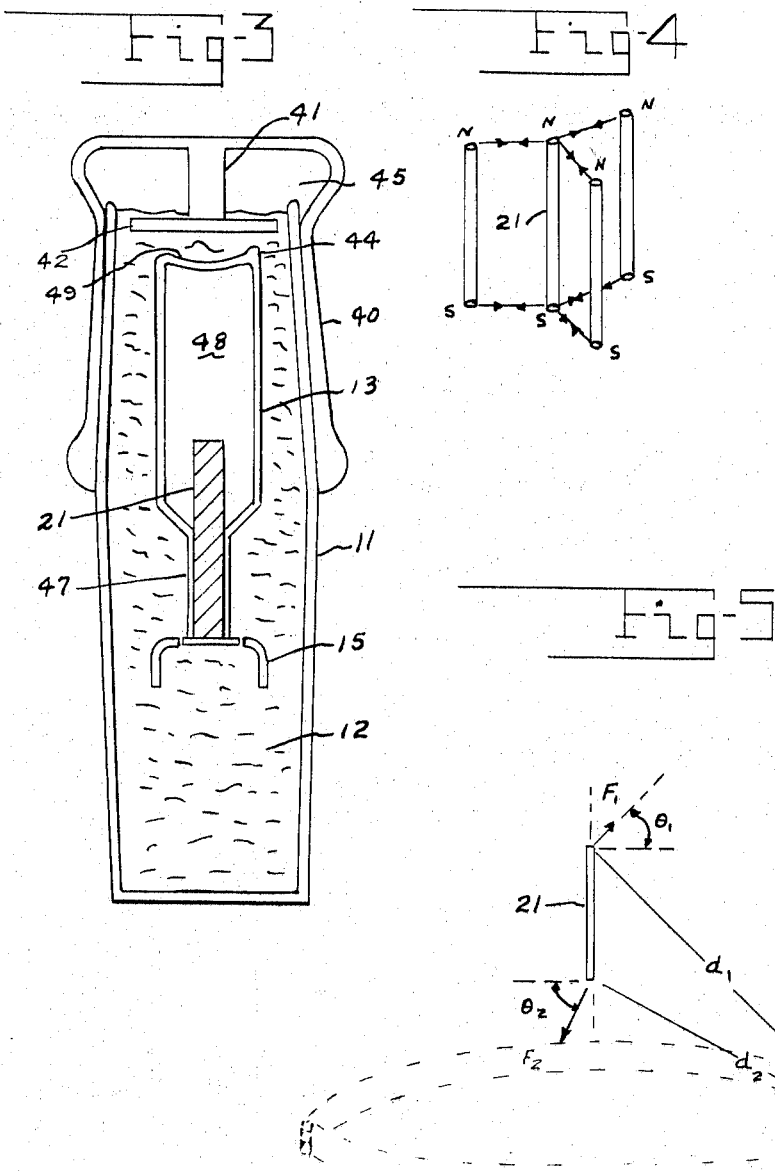

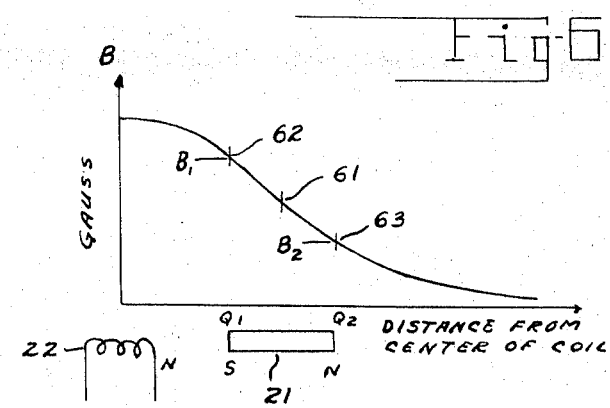
Fig-6
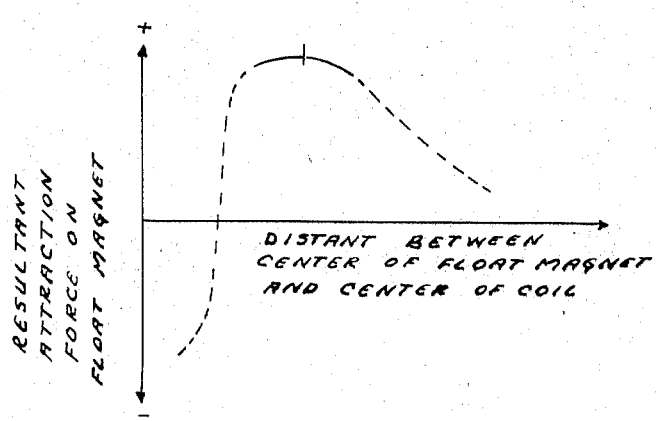
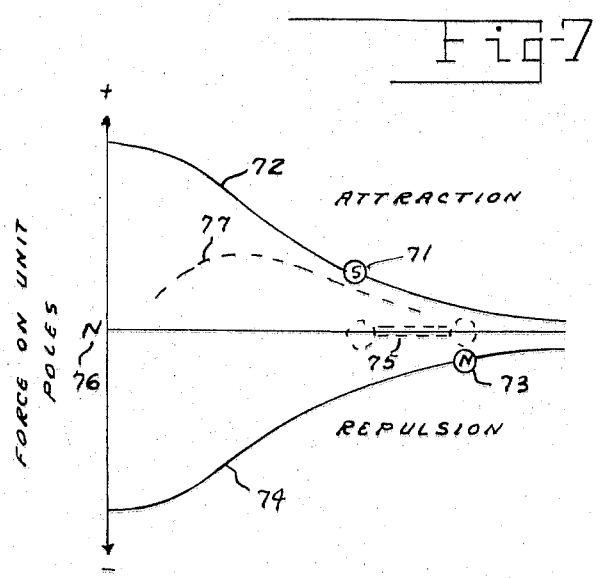
Fig-7

MAGNETIC FLOAT PYCNOMETER

BACKGROUND OF THE INVENTION

The field of this invention is in the art of magnetic fluid density measuring apparatus.

Prior art is exemplified by U.S. Pat. Nos. 3,503,267 to Kamekichi Shiba et al., 3,388,585 to C. W. Hargens III, and 2,922,300 to G. K. Woods.

SUMMARY OF THE INVENTION

A pycnometer with a magnetic float, magnetically stabilized in both horizontal and vertical directions, suspended in a fluid in a couette provides essentially a friction free float in which the relative density of the fluid in the couette surrounding the float is measured by the magnitude of current in a force coil required to position the float with respect to a light beam. With the couette in a temperature controlled environment to ± 0.0002°C within the range of 25° to 50°C, relative fluid density measurements with accuracies to one part per $10^6$ gram per cubic centimeter are obtained.

BRIEF DESCRIPTION OF THE DRAWING

FIG. 3 is a pictorial representation of a typical couette containing a magnetic float;

FIG. 4 is a schematic drawing showing the action of the repeller magnets;

FIG. 5 is a representative plot showing the magnetic force from the force coil on the permanent magnet in the float;

FIG. 6 is a representative plot showing the relationships between the magnetic flux from the force coil (upper part of figure) and the resultant force on the float magnet (lower part of figure) with axial distance from the coil; and FIG. 7 is a simplified plot of the forces on unit poles from a North pole and the resultant forces on a body containing the unit poles at a given distance apart.

DESCRIPTION OF THE PREFERRED EMBODIMENT

Figure 1:
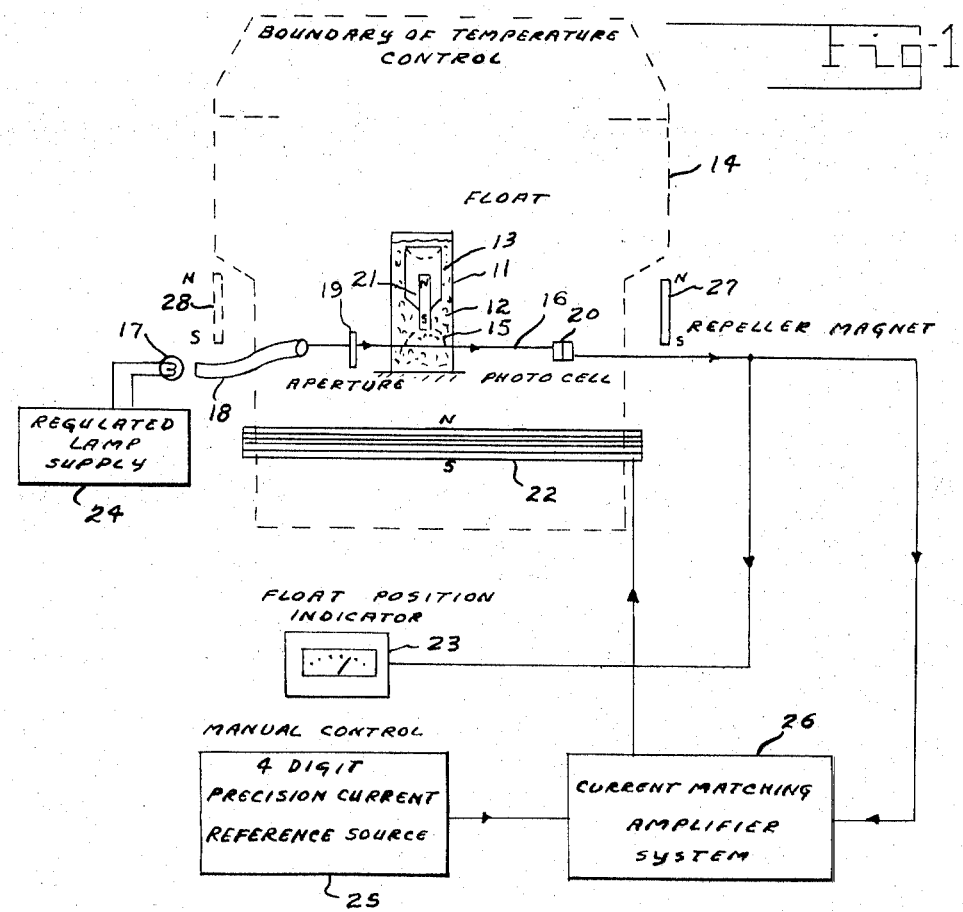
FIG. 1 is a simplified block-pictorial-schematic representation of an embodiment of the invention.

Previous magnetic float pycnometers have experienced the difficulties of friction of the float against the couette walls, vertical instability of the float with the tendency to run away, and a lack of a sufficiently extended uniform force field to provide uniformity and repeatability of measurements. The present invention overcomes the difficulty of friction between the float and the side walls of the couette by magnetic centering. The vertical instability and runaway action of the float in prior instruments was due to the following conditions. The buoyancy force on the float acts in an upward direction with substantially a constant force. The downward force of gravity is also substantially constant. The buoyancy force is generally made slightly greater than the gravitational force hence the float has essentially a slight constant upward force. A balance between this upward force and a downward magnetic force has been previously attempted but prior devices have met with little success. This has been due to the fact that the magnetic force of attraction on conventional magnetic material is inversely related by essentially an exponential function to the distance that the magnetic material being attracted is located, from the magnetic force field. Thus, the requirements on an electrical circuit positioning the float by magnetic attraction have been most severe. Even with high resolution feedback, it is always a case of a little being too much. This may be understood by considering the fact any slight disturbance from an exact balance, if it could be attained, either in an upward direction or a downward direction would result in a runaway situation due to the force on the float, with constant current in the coil, increasing with a slight downward movement of the float further pulling the float downward. This then necessitates decreasing the current in the force coil permitting the float to rise, once the float starts upward the magnetic pull decreases still further than the proportional decrease in current in the force coil and runaway then in an upward direction takes place. The instability resulting from the foregoing action and the inability of obtaining repeatability of measurements has made prior magnetic float pycnometers unsatisfactory. In this invention the magnetic float contains a permanent magnet and by the unique results obtained by operating the float at such a position in the magnetic field from the force coil that the force of attraction pulling the float downward is substantially constant with distance variations, over an operating range, stability is readily achieved. Slight biasing of the float may readily be obtained either in an upward direction, i.e., the force on the float slightly decreases as it approaches the force coil, or it may be biased in a downward direction such that the force on the float slightly increases as it approaches the force coil, by the proper selection of the float magnet and its position in the magnetic field from the force coil. Thus runaway is avoided and a relatively uniform force field over an extended region is provided. This allows for slight imperfections and misalignments in the construction of the device and the repeatability of measurements is readily obtained.

FIG. 1 shows a simplified outline of an embodiment of the invention. The couette 11 contains the fluid 12, of which the density is to be determined, and the float 13. The couette is positioned in the temperature controller 14 which maintains the couette and its contained fluid at a known temperature. The temperature control system is not a part of this invention, but the desirability of a constant accurately known temperature in making density measurements is well known. The couette rests on the floor of the inner chamber of the temperature controller. The temperature controller is constructed from non-magnetic materials. The couette is a conventionally fabricated glass structure. At least the lower part of the couette must be transparent so that the position of the float in the fluid may be determined by the opaque part 15 of the float intercepting the light beam 16. The light beam 16 is generated by a conventional incadescent lamp 17, such as a type CM-20, mounted outside the temperature controller. The illumination from the lamp is conducted inside the temperature controller to the inner chamber containing the couette by the conventional fiber optic bundle 18. The light from the fiber optic bundle passes through an approximately three-sixteenths hole or aperature 19 in the inner container to define the position of the light with respect to the couette and the photocell 20. A Clairex type 604L is an example of a suitable photocell. The float 13 which is made slightly buoyant in the fluid is attracted, i.e., pulled downward by the interaction of the float magnet 21 and the field from the force coil 22 to intercept a determined portion of the light passing from the aperature to the photocell. A conventional milliameter 23, in the particular embodiment described a 5 ma movement meter, indicates the position of the float with respect to the light beam. In a typical embodiment, full light from the aperature is set by adjusting the regulated supply 24 to produce a determined reading such as approximately 80 percent of full scale deflection on the meter. This determines a first reference point in the operation of the equipment. Then the precision decade resistance 25 is manually adjusted to provide a determined reading such as 60 percent deflection on the meter and the relative density of the fluid is obtained by either calculating the density of the fluid by conversion from the resistance read on the dials, or the dials of the decade resistor may be calibrated to read density directly. The actual magnitude of the meter readings previously referred to are not critical. Current feedback is used in the current matching amplifier system 26 as will be described later.

Figure 2:
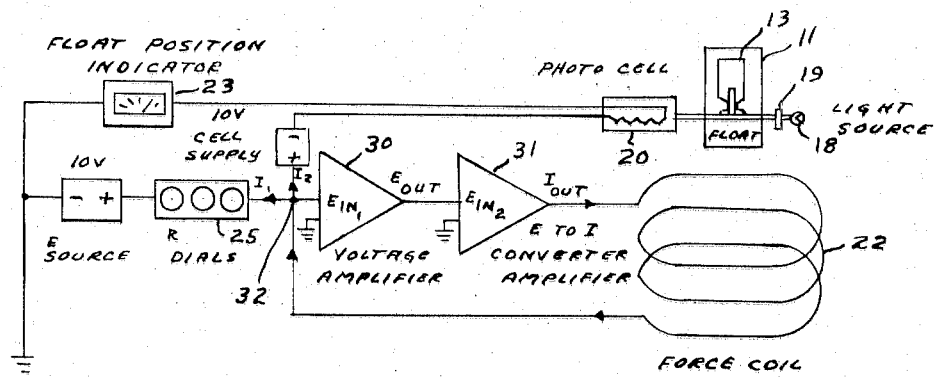
FIG. 2 is a more detailed schematic representation of the electrical system of the foregoing embodiment.

A schematic diagram of the electrical circuit of a typical embodiment is shown in FIG. 2. The amplifier system comprises a conventional voltage amplifier 30 and a current or power amplifier 31. As will be described later, the float is positioned in the magnetic field such that a small part of the total magnetic force depends upon float position. Thus, feedback may be used to hold the float in vertical equilibrium. This provides partial automation of float control while maintaining high stability of the larger manually selected current component. The feedback maintains the summing point 32 at a virtual ground potential. Thus, any departure from ground potential is an input signal to the voltage amplifier 30 which causes an increase or decrease in the output current of amplifier 31 flowing through the force coil 22 which will tend to return the summing point to ground potential. Amplifiers 30 and 31 are powered from a negative potential. The arrowheads on the schematic diagram represent electron flow. (For the earlier current flow concept they would be reversed in direction.) Since the input to the voltage amplifier is virtually zero and essentially no current flows into the amplifier the summation of currents at point 32 may be expressed: $I_1 + I_2 = I_{out}$, where $I_1 = (E \text{ source}/R_{dials})$, and $I_2 = (E_{cell \; supply})/(R_{photocell})$, $I_{out}$ being the current through the force coil. (The resistance of the Float Position Indicator meter is very low and can generally be neglected.) The circuit also has the advantage that the current through the force coil is independent of the resistance of the coil. Thus, changes in temperature of the coil will not effect the current through it and the gauss field from the coil will be independent of the temperature of the coil. (H is proportional to NI, and $B = H$ in a non-magnetic environment.)

FIG. 3 is a pictorial representation of a typical couette and magnetic float. The couette 11 including its cover 40 are conventionally fabricated from pyrex glass, substantially cylindrical in shape. The upper part (cover 40) and lower part (11) fit together as a ground joint. A short glass rod 41 is fused in the inside to the middle of the cover and a Teflon disc 42 is horizontally attached (cemented) to the end of the rod. The disc serves as an upper stop which limits the floats upward movement.

It is essential that the amount of liquid 12 (of which the density is to be determined) in the couette be sufficient to keep the lower surface of the Teflon disc 42 totally immersed in the liquid after the cover has been closed. When such is the case the float cannot rise above the liquid level and thus it is not influenced by the surface tension. To prevent possible significant adhesion forces between the float and the Teflon disc a small round protrusion 44 is fabricated in the upper part of the float. Only the protrusion touches the Teflon disc as the float rises and the common area of influence is very small. The air space 45 above the liquid level is not critical.

The float 13 is fabricated from pyrex glass, having an opaque section 15 at its lower end, and sealed to enclose air 48 for appropriate buoyancy. A permanent magnet rod 21 is sealed in the stem portion 47 of the float. The stem connects the main end lower part of the float and provides a suitable metacentric height (the distance between the center of gravity and the center of buoyancy) for stability. The exact location of the metacenter is not critical. Positions for the center of buoyancy slightly below the center of the air chamber 48 and for the center of gravity slightly above the center of the magnet 46 have been found to be satisfactory. The couette, and the float are round in cross section and concentric about a vertical axis, with the exception of the small protrusion 44.

The float is stable on the axis of the force coil solenoid. It is centered horizontally by the field from the force coil and the fields from the repeller magnets and held in vertical equilibrium by the resultant magnetic forces from the force coil and the permanent magnet in the float. These will be further explained later. The resultant vertical magnetic force supplies the difference between the downward weight and the upward buoyant force. Ideally, the magnetic force should, at most, constitute only approximately 1/500 of the float's weight; therefore, the float should be made nearly neutrally buoyant in the liquid to be measured. Thus, in a typical embodiment for various density liquids a set of floats are fabricated with different stem-length to mainbody ratios. However, a single float can readily be modified for denser liquids by wrapping platinum wire around and above the stem of the float. In arriving at the proper buoyancy of the float in an unknown solution small pieces of platinum may be placed in the slight upper concavity 49 of the float 13 until the float just starts to sink in the unknown fluid when the fluid is at a temperature slightly higher or lower (the direction determinative of producing the less denser condition) than the controlled temperature at which temperature controller is to be operated. The weight of any platinum added to the top of the float is converted to the proper length of wire and the wire wrapped around the stem. In operation it is generally desirable that added weight be placed below the center of buoyancy, however with a relatively large metacentric height, i.e., the center of gravity well below the center of buoyancy, it takes considerable neglect to tilt the float position from vertical by the addition of small platinum weights to the top of the float and while it is always preferable to add the bulk portion of the added weight near the bottom of the float, the final touch-up weight may suitably be added on top.

Equally spaced around the periphery of the temperature controller 14 (FIG. 1) are repeller magnets 27 and 28, to aid in the horizontal centering of the float. These magnets are positioned vertically in approximately the same horizontal area with relation to the operating range of the float magnet and are poled such that the float magnet is repelled and tends to be centered by their magnetic forces as shown schematically in FIG. 4. While these repeller magnets do aid in centering the float horizontally their main function is to aid in reducing the effects of external magnetic fields, including the earth's field on the float magnet. (Horizontal centering action as explained later also occurs from the force coil.) Generally three magnets spaced 120° apart, concentric with the vertical axis of the system have been found suitable for the repeller magnets of the device.

The force field, a major element of this invention of providing an improved pycnometer, has the following primary features; (a) a centering of the float without the need of guides thus providing substantially a truly frictionless levitated float, (b) lock-in of the vertical position of the float by a self-correcting vertical field gradient preventing runaway and instability encountered in the conventional apparatus where the field gets weaker with distance, and (c) uniformity and repeatability of measurements by providing a relatively extended region of uniform force field to allow for slight imperfections and misalignments in the fabrication of the apparatus.

The force coil 22 (FIGS. 1, 2, 5, and 6) is a relatively large diameter coil and it is placed outside the sensitive temperature regulator chambers of the controller 14 so that any heat generated in the coil will have negligible effect on the temperature controller. In general, the coil's field strength and the float's magnet strength are not critical per se and can be varied to suit the forces desired on the float, the resultant forces related to the location of the float relative to the inflection point of the coil's fields are critical. The horizontal centering of the float results from the combined action of the repeller magnets, which are not critical, and magnetic forces from the interaction of the fields from the force coil and the permanent magnet. This may best be understood by referring to FIG. 5, which shows both horizontal and vertical forces on the float. The magnetic force from the coil 22 attracts the lower end of the magnet in the float and repels the upper end of the magnet. In the embodiment represented, the lower end of the float magnet has a south pole and the upper end of the coil a north pole. The actual polarities throughout the system are not critical, their relationships to each other are critical. Considering an elemental length of the coil 22 as shown in FIG. 5, the resulting force of attraction $F_2$ on the lower end of the float magnet 21 may be resolved into a horizontal force $F_2 \cos\theta_2$ and a vertical force $F_2 \sin\theta_2$. At the other end of the magnet the repelling force $F_1$ may be resolved into a horizontal component $F_1 \cos\theta_1$, and a vertical component $F_1 \sin\theta_1$. Integrating the forces around the coil, it may be seen that the horizontal forces tend to center the float magnet on the axis of the coil where the horizontal forces balance or cancel out. This action provides horizontal centering. The vertical forces add and provide a force of attraction at the lower end of the float magnet and a repelling force at the upper end of the magnet. When $F_2 \sin\theta_2 > F_1 \sin\theta_1$ the force on the float magnet tends to move it toward the coil and when $F_2 \sin\theta_2 > F_1 \sin\theta_1$ the float magnet is repelled. (A soft iron magnetic float member (not a permanent magnet) would always be attracted toward the center of the coil with increasing force as the distance decreased.) The upper curve of FIG. 6 shows a typical flux density (B) plot with respect to distance from a coil. It is to be observed that the curve has a point of inflection 61 and two points 62 and 63 of approximately equal slope. In the far-field condition, i.e., beyond the point of inflection, the float magnet is attracted with increasing force as the distance is decreased. When the float magnet is positioned with the near pole at point 62 and the far pole of point 63 (generally the center of the magnet will be at or near the point of inflection) the force of attraction on the near pole decreases at the same rate the repelling force on the far pole increases, as the magnet tends to move toward the coil, thus, the attraction to as a whole float magnet, as a whole, due to changes in distance remains substantially constant for relatively small movements. This is shown on the force diagram in the lower part of FIG. 6. Now, slight increases or decreases in the current in the force coil will position the magnet against the buoyancy force without the complexity of changes in force resulting from distance variations. In an embodiment of the invention, it was determined that the float may move vertically by approximately one-sixteenth inch with negligible change in the magnetic force due to the change in spacing of the float magnet from the coil. The current in the coil is thus substantially the sole controlling factor in the positioning of the float against the buoyancy force.

The foregoing may be further understood by considering the theoretical and extremely simplified conditions exemplified in FIG. 7. Considering unit poles traveling in the magnetic field emanating from a north pole N, the flux encountered by the south unit pole 71 and the force of attraction on it may be represented by curve 72. The repulsion force on the unit north pole 73 is likewise represented by curve 74. When these two poles are rigidly attached together with a spacing member 75 and moved toward the north pole 76 the resulting force on the combined poles is shown by the dotted line 77. It may readily be seen that once the south unit pole passes to the left of the north pole 76 that the force on the south unit pole tends to move it to the right, the same direction as the repelling force acts on the unit north pole. Referring to FIG. 6, the float magnet 21 has equal magnetic strength south and north poles designated respectively $Q_1$ and $Q_2$, thus, $|Q_1| = |Q_2|$. The force of attraction on the south pole may be represented approximately by a constant K times the product of the field from the coil and the field from the magnet or $KQ_1B_1$. Likewise the force on the north pole may be represented by $-KQ_2B_2$. Minus, since it is in the opposite direction. The resulting force on the magnet as a whole is thus, $F = KQ_1B_1 - KQ_2B_2$ or by simplification $F = KQ(B_1 - B_2)$, since $Q_1 = Q_2$. The change in force $dF$ over distance $D$ is therefore $(dF/dD) = KQ[(dB_1/dD) - (dB_2/dD)]$, and since the slopes of the curve are equal at points 62 and 63 $(dB_1/dD) = (dB_2/dD)$ making $(dF/dD)$ a constant which indicates that substantially no change in force occurs for small vertical changes in the float position for a constant field from the coil. A complete equilibrium of constant forces with variations in distance would obviously result in a non-determinative float position, thus it has been found preferable to position the float (i.e., when the float is intercepting the determined amount of light constituting the calibration point, as previously referred to) so that it is just slightly below the peak force and so trades a small amount of uniformity for improved (certain) lock-in. The downward force on the float will thus slightly increase as the float tends to rise due to the buoyancy force, this gives the feedback system control, such that changes in the amount of light falling on the photocell will change the current in the force coil to balance the forces. In this manner of operation substantially a linear relationship over the operating range is achieved between displacement and current and the feedback readily establishes a determined float position without any runaway tendencies.

In use, the device is first calibrated with liquids of known density such as water, 0.99221 g/cm$^3$; Tetraline 0.95368 g/cm$^3$; and Toluene 0.84796 g/cm$^3$. The apparatus has been found to have great utility in the measurement of the partial specific volume of polymers in solution.

Specific physical parameters of a typical embodiment comprise the following. The force coil is approximately twelve inches in diameter, 1 $\theta$ inches wide and has two hundred turns. A typical magnitude of current is 0.3 ampere thus providing ampere-turn fields typically in the range of 60 NI. The float magnet and the repeller magnets are of Alnico V material approximately one-eighth inch in diameter, magnetized to saturation and stabilized for open circuit operation. The length of a typical float magnet is approximately 2 ½ inches and the length of the repeller magnets are approximately 4 inches long. The repeller magnets are equally spaced at approximately six inches radial distance from the vertical center line. The operating range of the float magnet is such that its center is in the vicinity of approximately 2 ½ inches above the plane of the center of the force coil.

We claim:

1. A magnetic float pycnometer for measuring the relative density of a liquid contained in a transparent couette, comprising:

a. a float having an opaque section position in the said couette;

b. a permanent magnet having a predetermined length, positioned within the said float such that the center of buoyancy of the float is above the center of gravity.

c. means for providing a light beam in partial intercepting relationship with the said opaque section of the float;

d. a photocell providing an electrical output for receiving that portion of the said light beam not intercepted by the float;

e. a current meter cooperating with the output of the said photocell for indicating the position of the float with respect to the said light beam;

f. means, including a force coil, for providing a magnetic field having a force of attraction and a force of repulsion on the said float magnet, the said magnetic field having external to the said coil an axial magnetic field density which, on a flux density vs. distance plot provides a point of inflection approximately equal distant from two points of equal slope, the said points of equal slope being spaced apart a distance approximately equal to the said predetermined length of the permanent magnet;

g. means including a voltage source and a calibrated variable resistance cooperating with the said force coil for manually setting a determined force on the float magnet to position the float to a predetermined position with respect to the said light beam, such that the center of the said permanent magnet is located approximately at the said point of inflection;

h. a feedback amplifier responsive to the output of the said photocell, cooperating with the said force coil, and the said voltage source and calibrated variable resistance, for maintaining the said determined force on the float magnet; and i. a plurality of permanent magnets, positioned exterior the said couette in repelling relationship to the said float magnet, for reducing the effects of external magnetic fields and providing horizontal centering of the said float magnet.

* * * * *